(12) United States Patent
Anderson

(10) Patent No.: US 7,901,015 B1
(45) Date of Patent: Mar. 8, 2011

(54) TRACTION CLEATS FOR TRACKED CONSTRUCTION EQUIPMENT

(75) Inventor: Deloren E. Anderson, Cross Lake, MN (US)

(73) Assignee: Deloren E. Anderson, Crosslake, MN (US)

( * ) Notice: Subject to any disclaimer, the term of this patent is extended or adjusted under 35 U.S.C. 154(b) by 0 days.

(21) Appl. No.: 12/050,272

(22) Filed: Mar. 18, 2008

Related U.S. Application Data

(60) Provisional application No. 60/896,611, filed on Mar. 23, 2007.

(51) Int. Cl.
*B62D 55/08* (2006.01)

(52) U.S. Cl. ........ 305/51; 305/162; 301/44.1; 152/225 C

(58) Field of Classification Search ................ 301/41.1, 301/43, 44.1, 45–46; 305/160–162, 180, 305/51, 187, 190–192; 152/167, 170, 178–180, 152/182–183, 185, 187, 208, 213 R, 216, 152/225 R, 226–227, 225 C
See application file for complete search history.

(56) References Cited

U.S. PATENT DOCUMENTS

| | | | | |
|---|---|---|---|---|
| 1,395,134 A | * | 10/1921 | Messner | 301/44.1 |
| 1,633,259 A | * | 6/1927 | Langenfeld | 152/228 |
| 2,504,568 A | * | 4/1950 | Morrone | 152/225 R |
| 3,291,180 A | * | 12/1966 | Gellman | 152/225 C |
| 4,813,466 A | * | 3/1989 | Forsyth et al. | 152/179 |
| 4,938,546 A | * | 7/1990 | Simmons | 305/180 |
| 5,044,415 A | * | 9/1991 | Ishihara | 152/228 |
| 5,569,340 A | * | 10/1996 | Ulrich | 152/225 C |
| 5,690,398 A | * | 11/1997 | Pribyl | 305/162 |
| 5,769,511 A | * | 6/1998 | Hattori | 305/51 |
| 6,557,954 B1 | * | 5/2003 | Hattori | 305/189 |
| 6,637,840 B2 | * | 10/2003 | Zaleski et al. | 305/193 |

* cited by examiner

*Primary Examiner* — Jason R Bellinger
(74) *Attorney, Agent, or Firm* — Schwegman, Lundberg & Woessner, P.A.

(57) ABSTRACT

A cleat for releasable clamped engagement to a continuous rubber track on a mobile construction unit for improving traction. The cleat includes (i) a body with downwardly extending, inwardly facing and laterally spaced end hooks, wherein at least one of the end hooks is laterally repositionable relative to the other end hook as between an open position and a closed position, (b) at least one projection extending upward from the body effective for biting engagement with a supporting surface, and (c) a manually operable repositioning assembly for reversibly driving the at least one laterally repositionable end hook towards the other end hook, whereby the body may be clamped onto a rubber track on a mobile construction unit.

6 Claims, 19 Drawing Sheets

TRACTION CLEATS FOR TRACKED CONSTRUCTION EQUIPMENT

This application claims the benefit of U.S. Provisional Application No. 60/896,611, filed Mar. 23, 2007.

BACKGROUND OF THE INVENTION

Track systems are often employed on mobile construction equipment to distribute the weight of the machine over a larger area and thereby enhance flotation and minimize ground disturbance. Metal tracks have been in widespread use on larger construction equipment for many years. Rubber tracks have gained popularity over recent years, particularly on smaller construction equipment.

Traction is often a concern when smaller construction equipment is used in muddy and/or icy conditions due to the lighter weight of the smaller equipment.

Accordingly, a need exists for a cost effective traction enhancement attachment for mobile construction equipment track systems capable of being quickly, easily and safely attached and detached from the track system.

SUMMARY OF THE INVENTION

A first aspect of the invention is a cleat for releasable clamped engagement to a continuous rubber track on a mobile construction unit for improving traction. The cleat includes a body, at least one traction enhancing projection, and a manually operable repositioning assembly. The body has downwardly extending, inwardly facing and laterally spaced end hooks, wherein at least one of the end hooks is laterally repositionable relative to the other end hook as between an open position and a closed position. The projection extends upward from the body for biting engagement with a surface upon which the track is supported. The manually operable repositioning assembly is effective for reversibly driving the at least one laterally repositionable end hook towards the other end hook, whereby the body may be clamped onto a rubber track on a mobile construction unit.

A second aspect of the invention is a method for enhancing the traction of a tracked mobile construction unit. The method includes the steps of: (a) obtaining a mobile construction unit equipped with a pair of tracks, wherein each track has an outward facing major surface and lateral sides, (b) obtaining a plurality of cleats, each comprising at least: (i) a body with downwardly extending, inwardly facing and laterally spaced end hooks, wherein at least one of the end hooks is laterally repositionable relative to the other end hook as between an open position and a closed position, (ii) at least one projection extending upward from the body effective for biting engagement with a supporting surface, and (iii) a manually operable repositioning assembly for reversibly driving the at least one laterally repositionable end hook towards the other end hook, (c) clamping a cleat onto the track by: (i) positioning the laterally repositionable end hook into the open position, (ii) laying the body onto the outward facing major surface of the track with the end hooks extending over the sides of the track and the at least one projection extending away from the outward facing major surface of the track, and (iii) actuating the repositioning assembly to move the repositionable end hook towards the closed position, thereby clamping the cleat to the track by catching the sides of the track within the end hooks and squeezing the track between the end hooks, (d) repeating step (c) to attach a plurality of longitudinally spaced cleats around the track, and (e) repeating steps (c) and (d) for the other track.

DETAILED DESCRIPTION OF THE INVENTION

Nomenclature

| | |
|---|---|
| 100 | Cleat |
| 120 | Main Body |
| 120a | Top of Body |
| 120b | Bottom of Body |
| 120c | Front of Body |
| 120d | Back of Body |
| 120e | First End of Body |
| 120f | Second End of Body |
| 140 | End Hook |
| 140a | Top of End Hook |
| 140b | Bottom of End Hook |
| 140c | Front of End Hook |
| 140d | Back of End Hook |
| 140e | Inside End of End Hook |
| 140f | Outside End of End Hook |
| 141 | First End Hook |
| 142 | Second End Hook |
| 145 | Fingers |
| 146 | Stabilizing Fin |
| 148 | Retention Channel |
| 149 | Lateral Bore Through End Hook |
| 150 | Shoulder Bolt |
| 160 | Studs |
| 170 | Blade |
| 200 | Track |
| 200a | Outward Facing Major Surface of Track |
| 200e | Inside Edge of Track |
| 200f | Outside Edge of Track |
| 201 | Groove in Tread on Track |
| 300 | Mobile Construction Unit |
| x | Lateral Direction |
| $x_3$ | Lateral Distance Between Hooks |
| y | Longitudinal Direction |
| z | Transverse Direction |
| $z_1$ | Upward Transverse Direction |
| $z_2$ | Downward Transverse Direction |

Construction

A first aspect of the invention is a cleat 100 configured and arranged for detachable attachment in spaced arrangement around the rubber tracks 200 on a mobile construction unit 300 (e.g., skid steer loaders) in order to enhance fraction.

Figure 4:
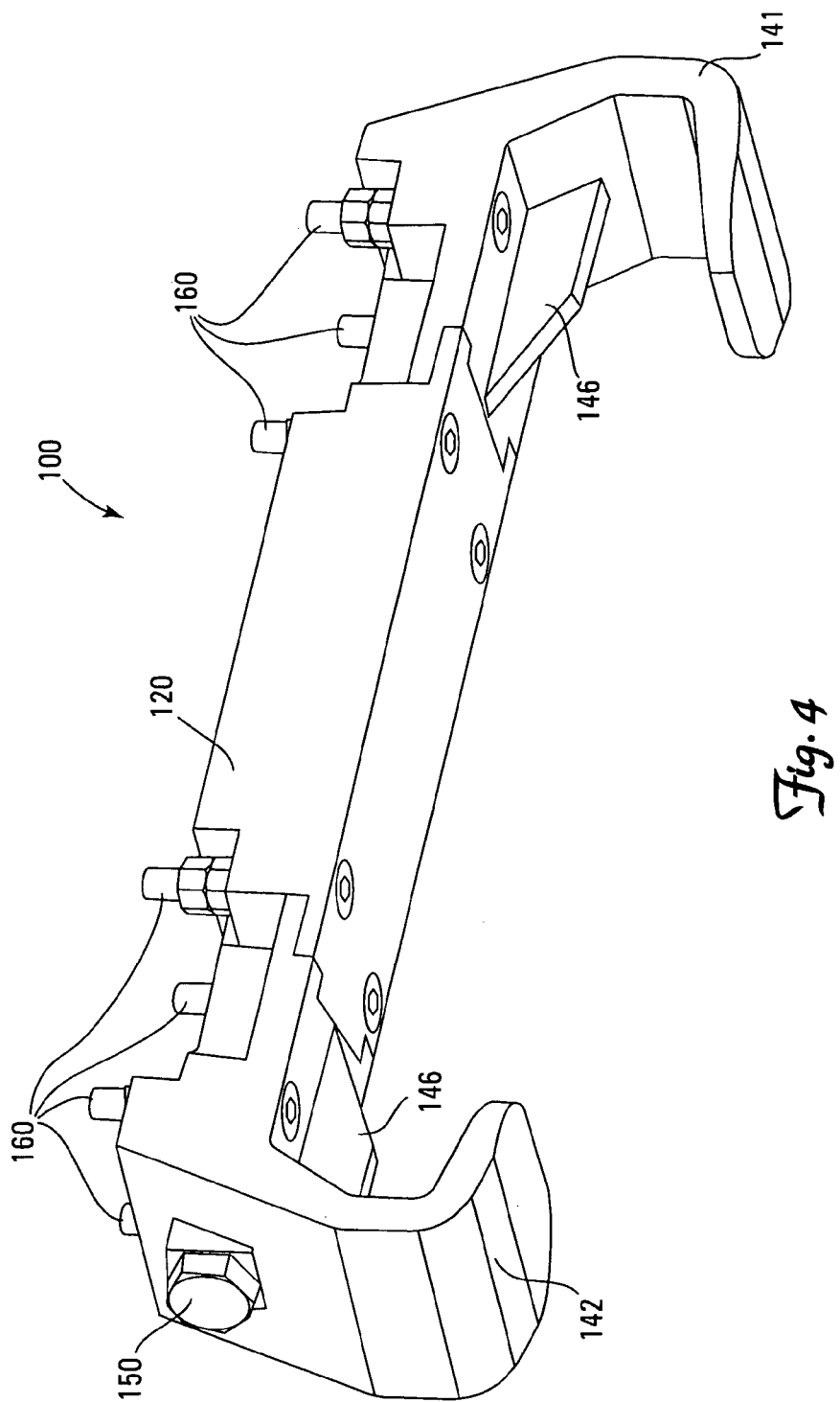
FIG. 4 is an upward perspective view of the invention shown in FIG. 1.
Figure 5:
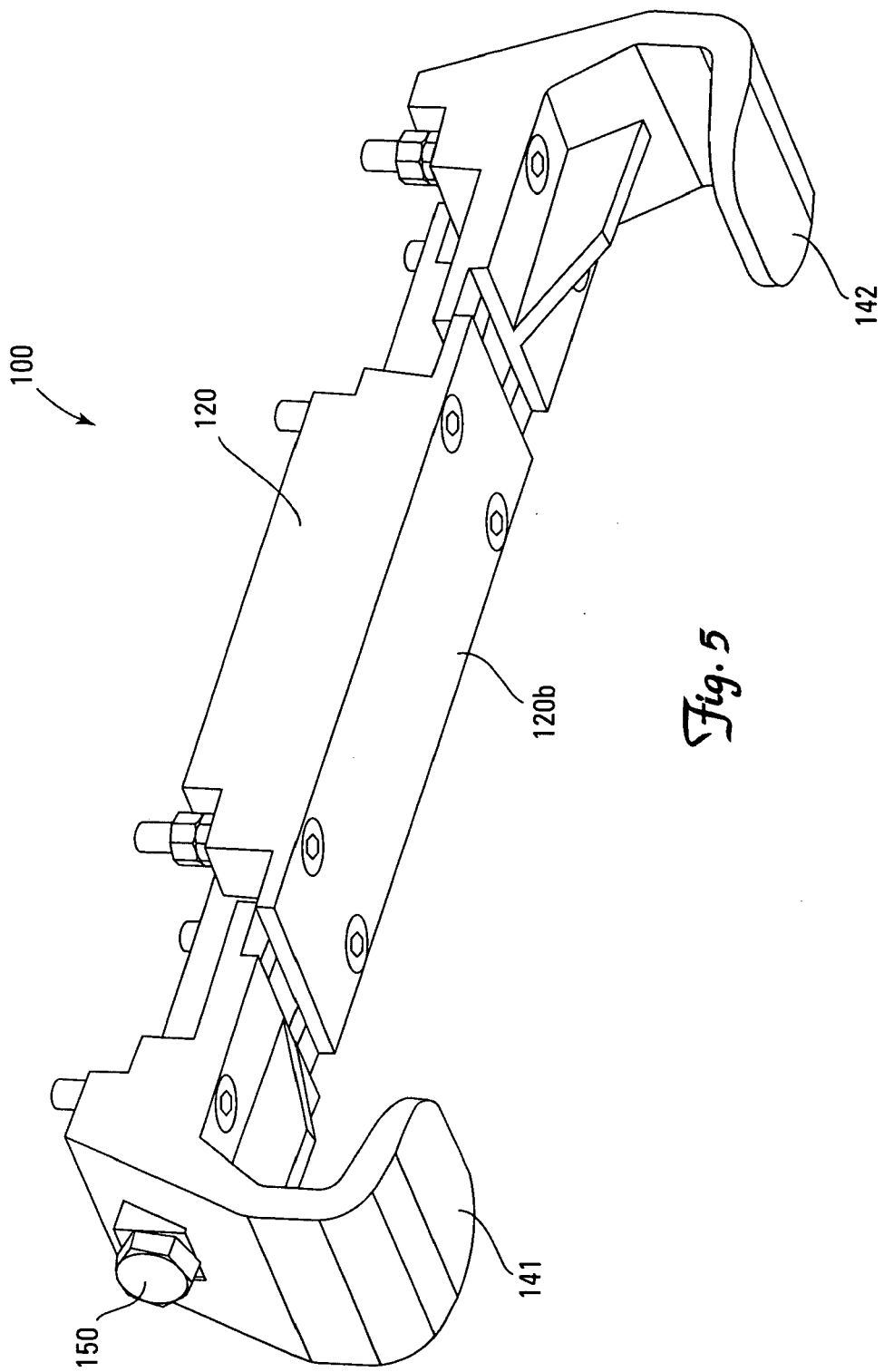
FIG. 5 is a perspective view of the invention shown in FIG. 5 with the end hooks laterally telescoped away from the main body.
Figure 6:
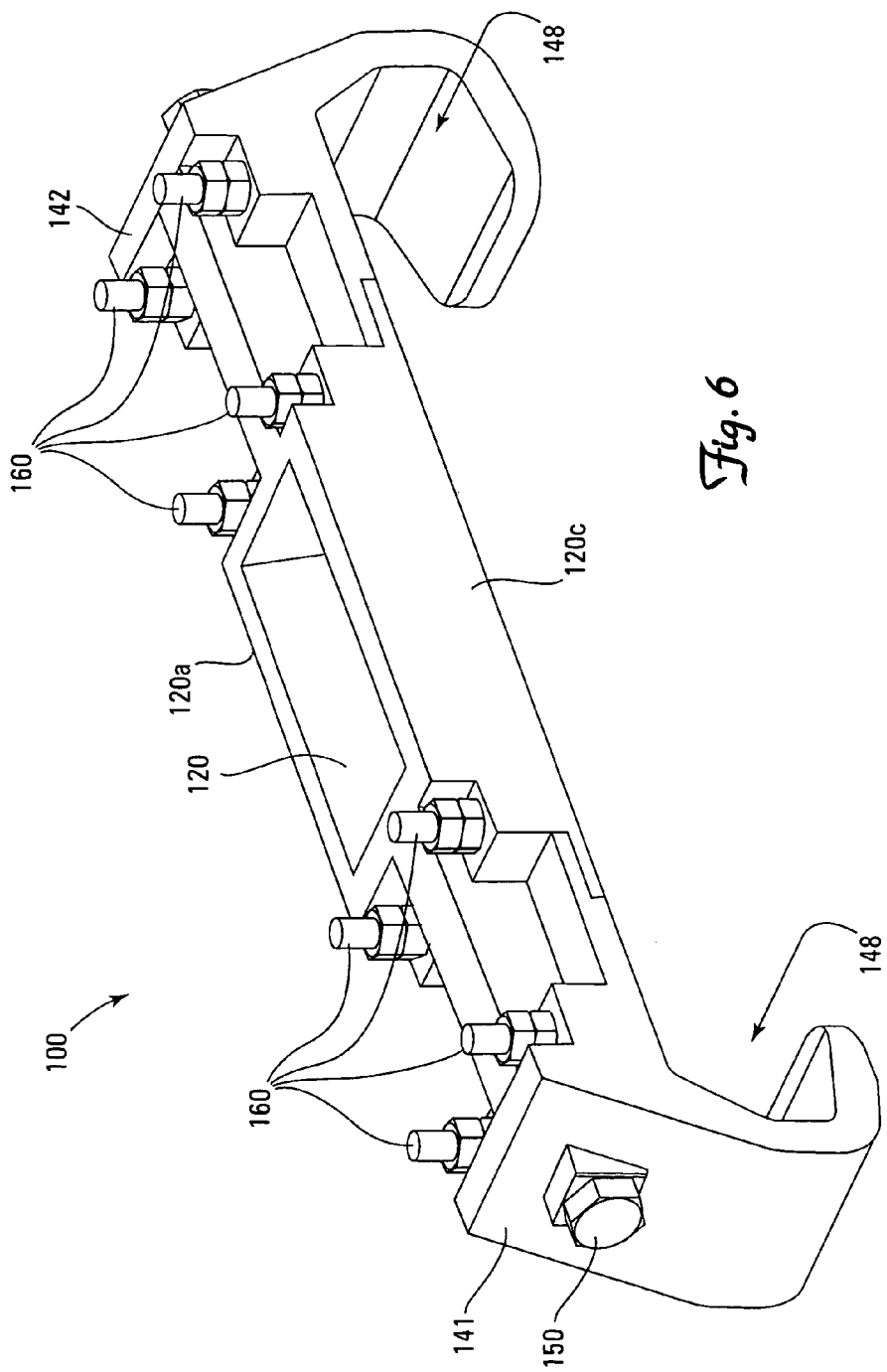
FIG. 6 is a downward perspective view of the invention shown in FIG. 1.

Referring to FIGS. 1-6, the cleat 100 includes a body 120 with downwardly $z_2$ extending, inwardly facing and laterally x spaced end hooks 140. At least one of the end hooks 140, and preferably both end hooks 141 and 142, are laterally x repositionable relative to the other end hook 140 as between an open position (as shown in FIG. 5) in which the lateral distance $x_3$ between the end hooks 140 is larger, and a closed position (as shown in FIG. 4) in which the lateral distance $x_3$ between the end hooks 140 is smaller.

The embodiment of the cleat 100 shown in FIGS. 1-6 have a main body 120 with separate and independent end hooks 141 and 142, both of which are independently laterally x repositionable relative to the main body 120.

The embodiment of the cleat 100 shown in FIGS. 11-18 have a main body 120 with a single end hook 140 which can be laterally x repositioned relative to the main body 120.

Figure 1:
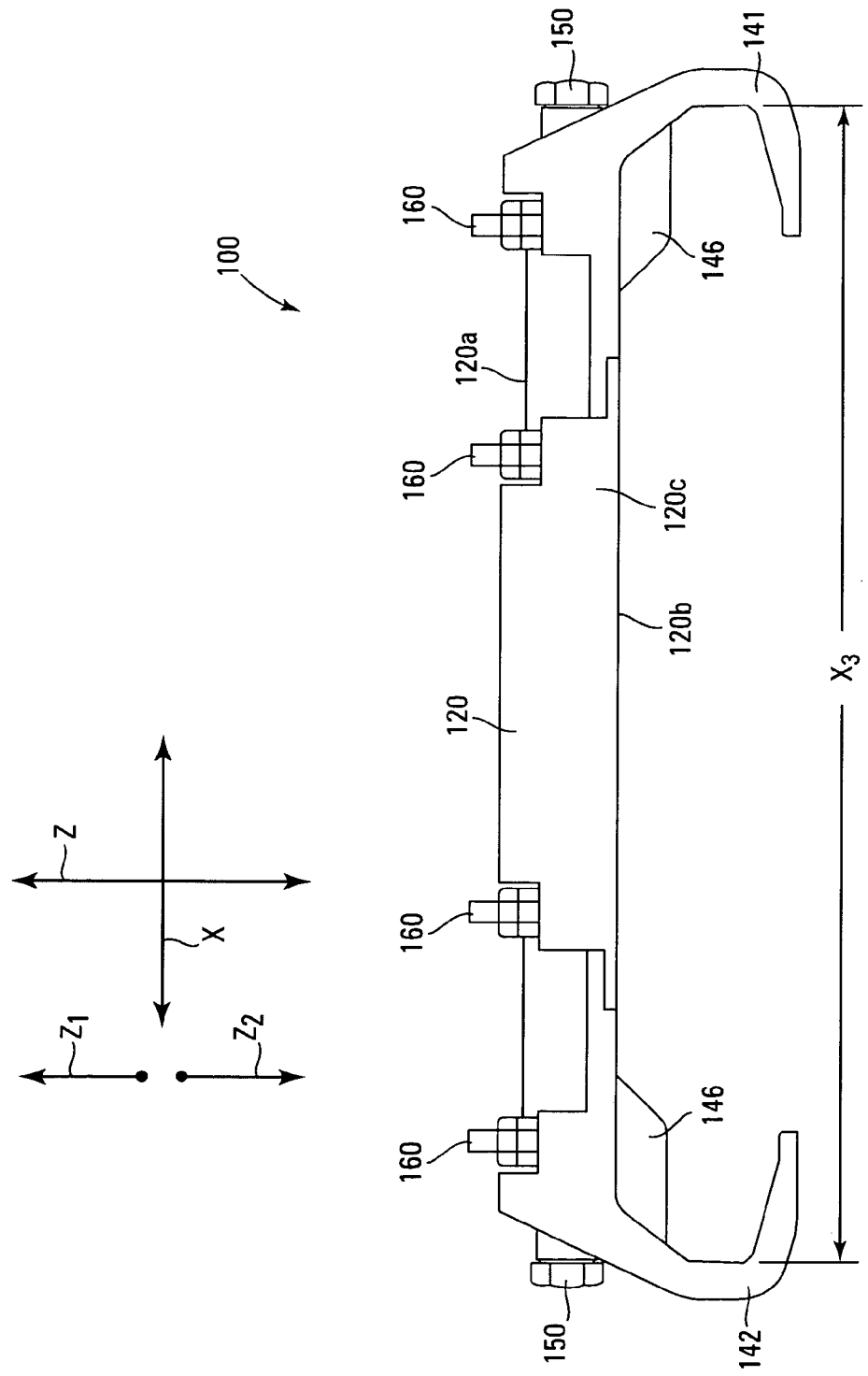
FIG. 1 is a front view of one embodiment of the invention.
Figure 2:
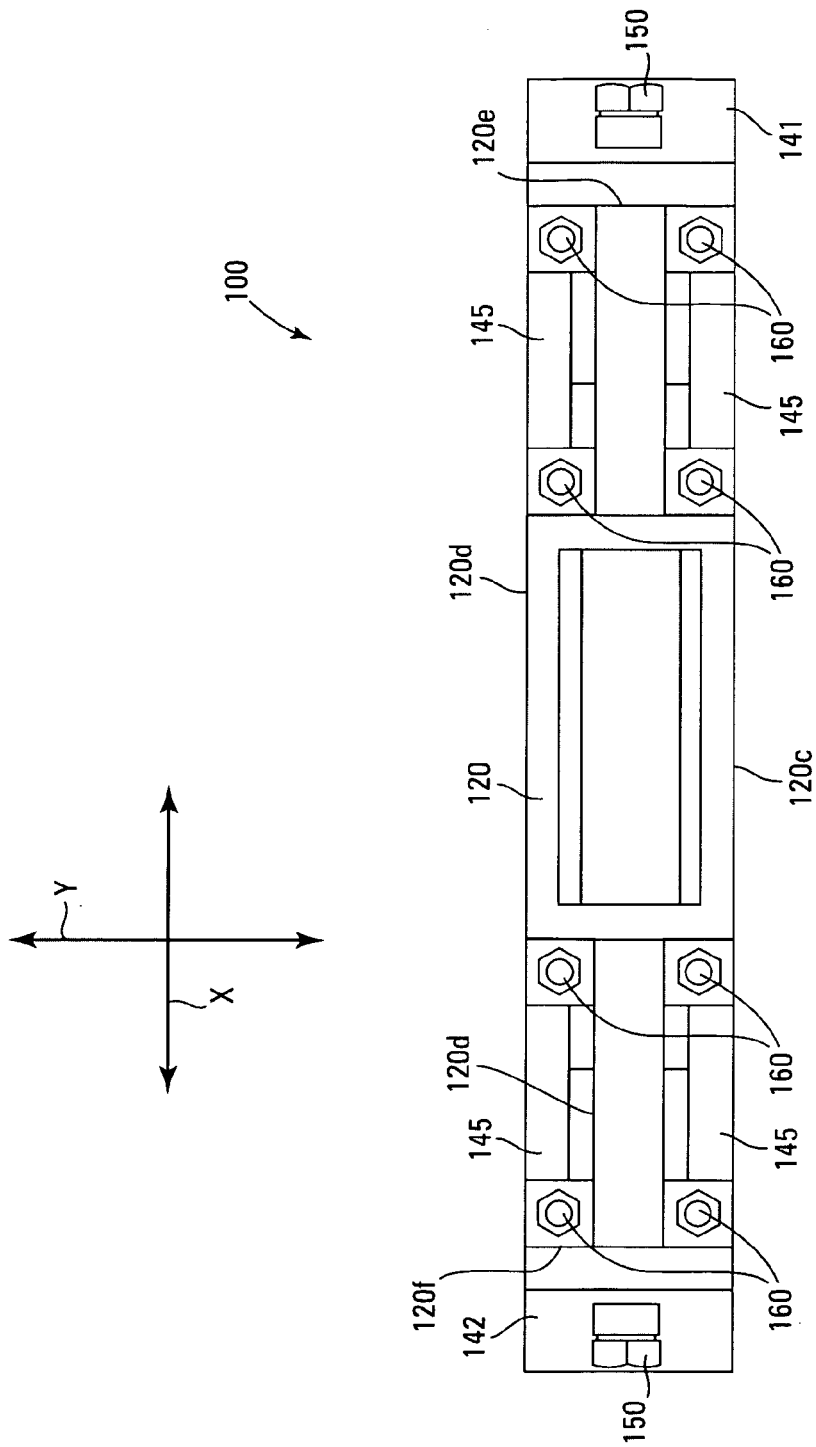
FIG. 2 is a top view of the invention shown in FIG. 1.
Figure 3:
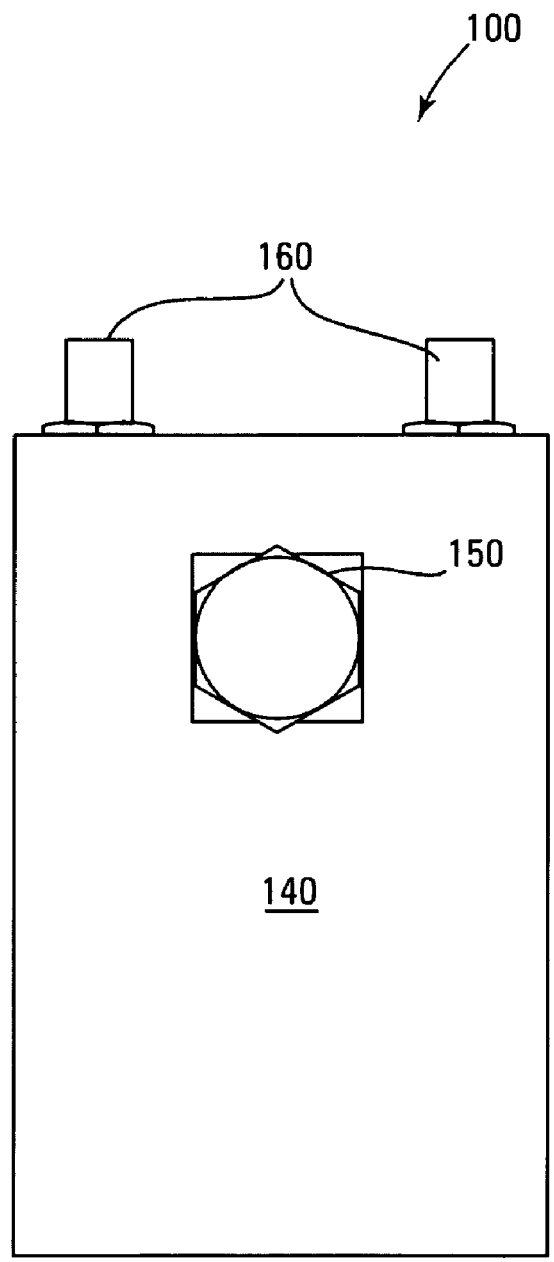
FIG. 3 is an end view of the invention shown in FIG. 1.

Referring to FIGS. 1 and 2, the main body 120 has a top 120a, a bottom 120b, a front 120c, a back 120d, a first end 120e and a second end 120f.

Figure 7:
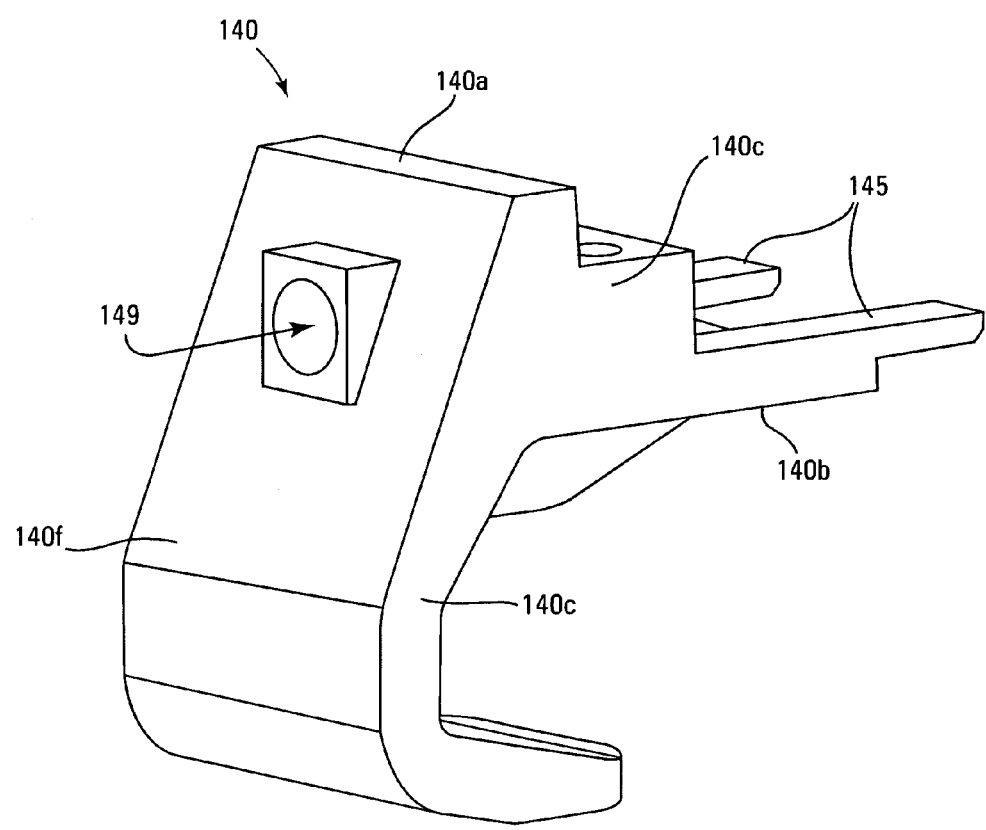
FIG. 7 is a first perspective view of an end hook shown in FIG. 1.
Figure 8:
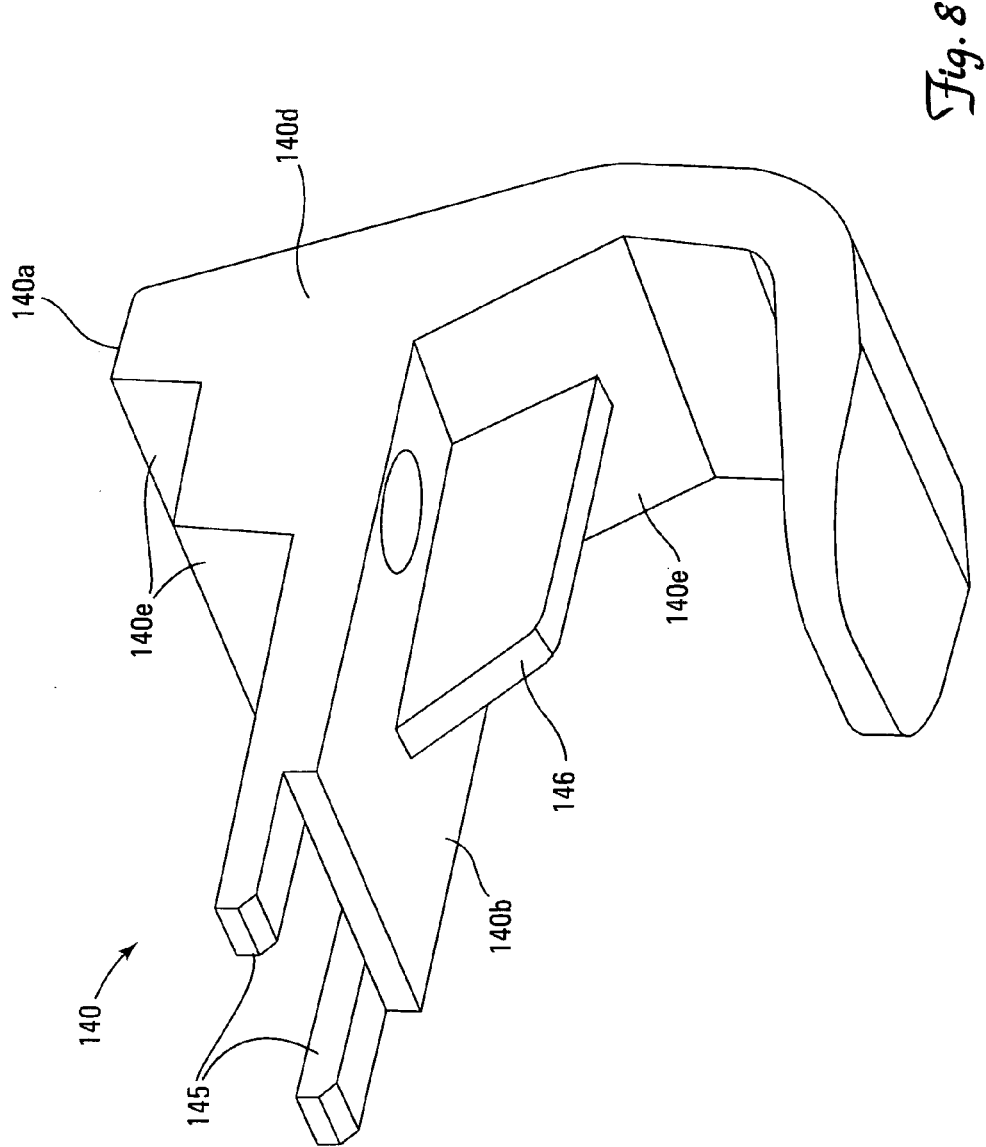
FIG. 8 is a second perspective view of the end hook shown in FIG. 7.

Referring to FIGS. 7 and 8, the end hooks 140 each have a top 140a, a bottom 140b, a front 140c, a back 140d, an inside end 140e and an outside end 140f. Each end hook 140 defines an inwardly facing retention channel 148 extending from the bottom 140b of the end hook 140. The retention channel 148 is configured and arranged to hook onto a side edge 200e or 200f of a track 200 on a mobile construction unit 300. A pair of longitudinally y spaced fingers 145 project inward from the inside end 140e of the end hook 140 above the retention channel 148 for telescoping engagement with corresponding channels (not shown) in the ends 120e and 120f of the main base 120.

Figure 9:
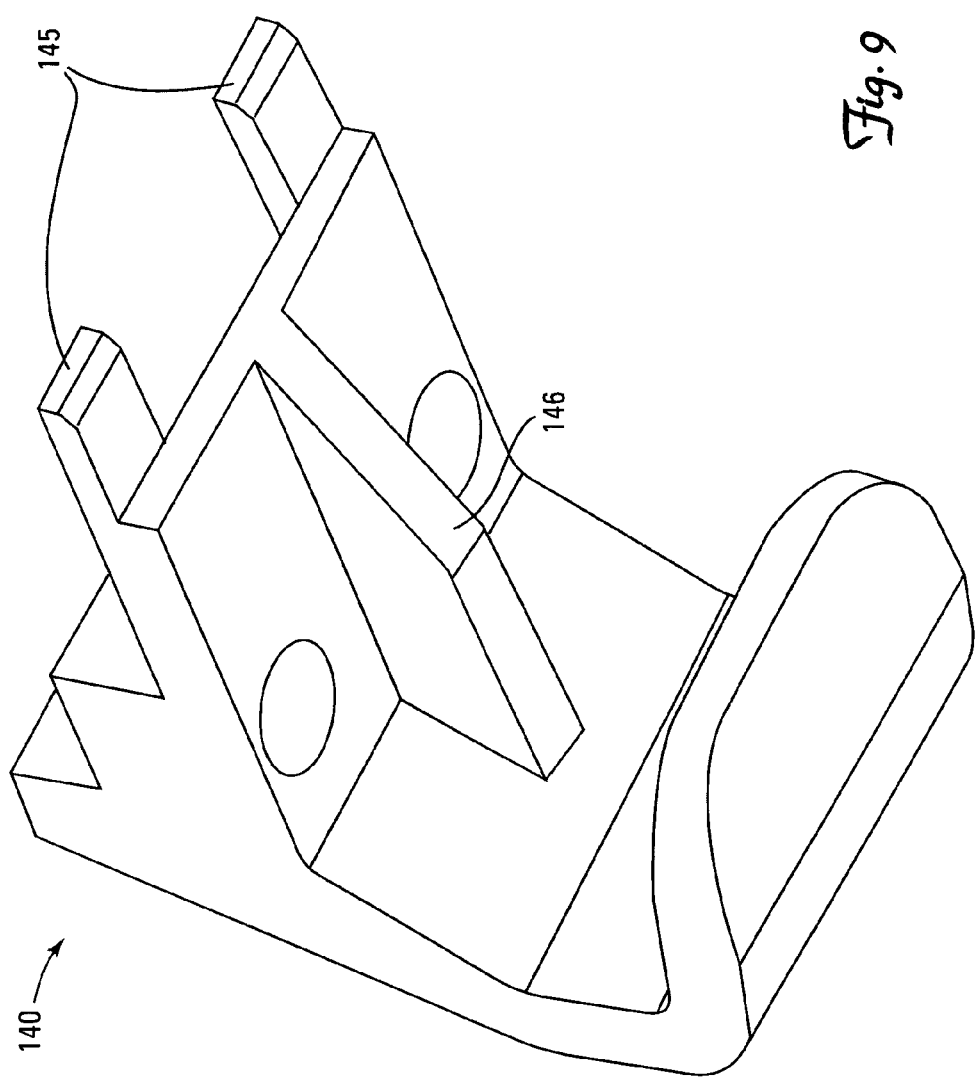
FIG. 9 is a third perspective view of the end hook shown in FIG. 7.

Referring to FIGS. 8 and 9, a stabilizing fin 146 projects transversely downward $z_2$ from the bottom 140b of each end hook 140 into the retention channel 148 defined by the end hook 140. The stabilizing fin 146 is configured and arranged to fit within a groove 201 in the tread on a track 200 for providing stability against sliding of the cleat 100 along the length of the track 200.

Figure 10:
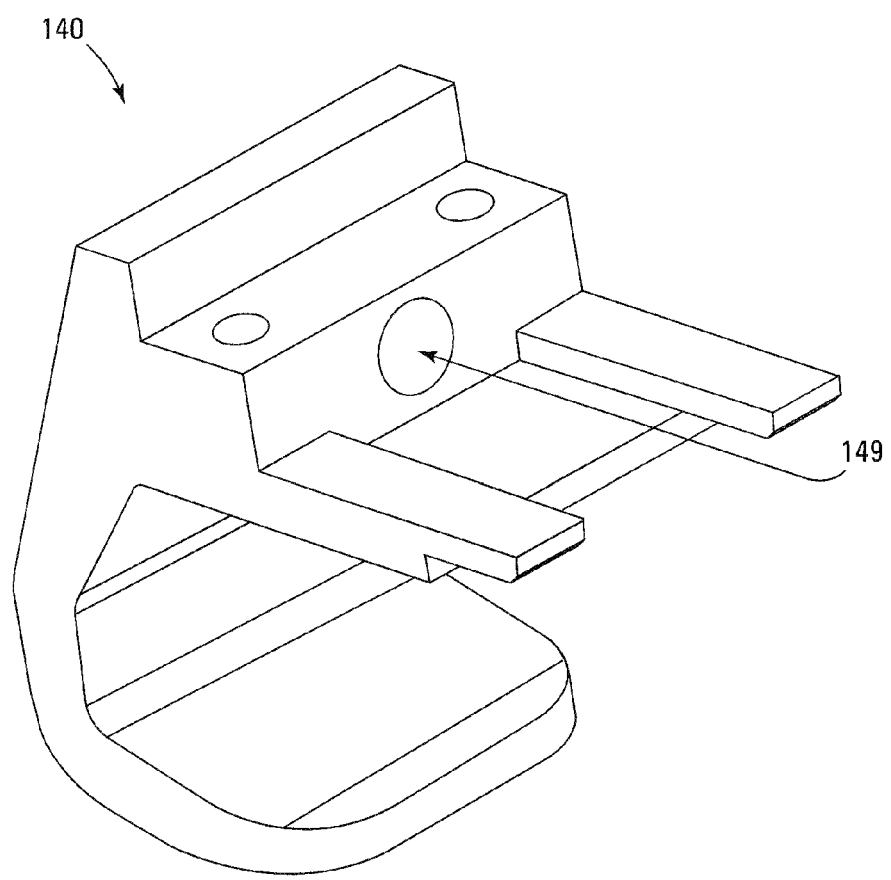
FIG. 10 is a fourth perspective view of the end hook shown in FIG. 7.
Figure 11:
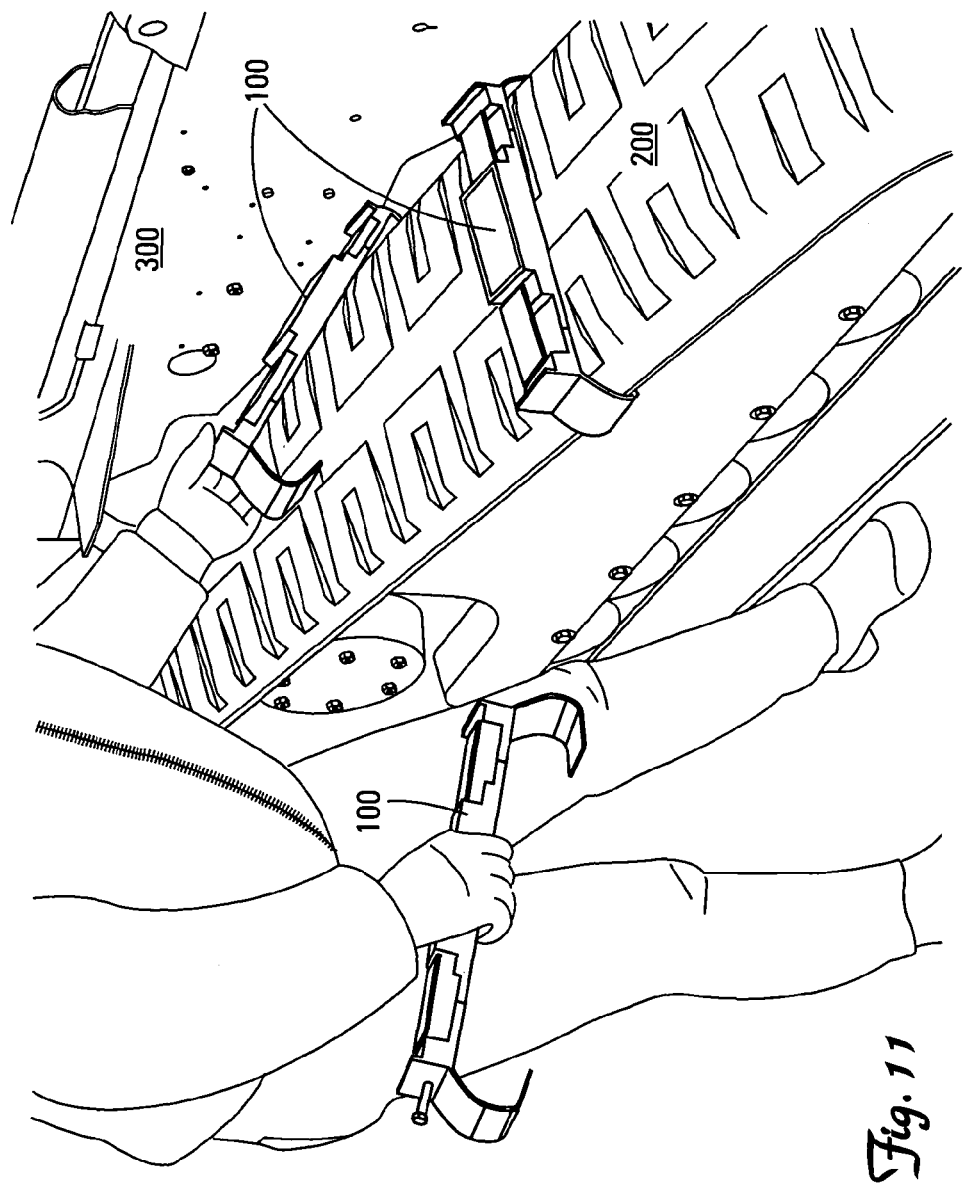
FIGS. 11-18 are perspective views of a set of cleats in accordance with a second embodiment of the invention being attached to a rubber track on a track loader.
Figure 12:
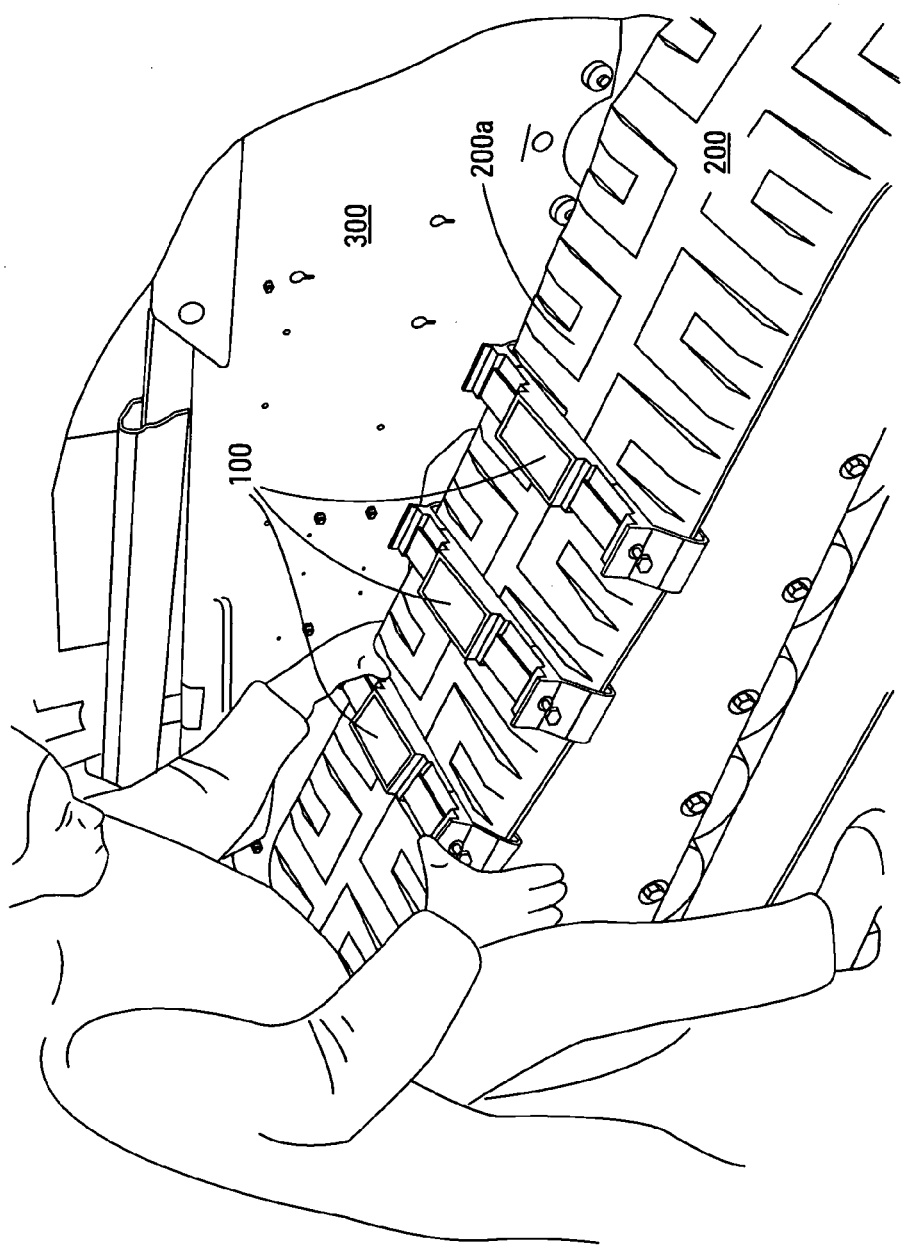
Figure 13:
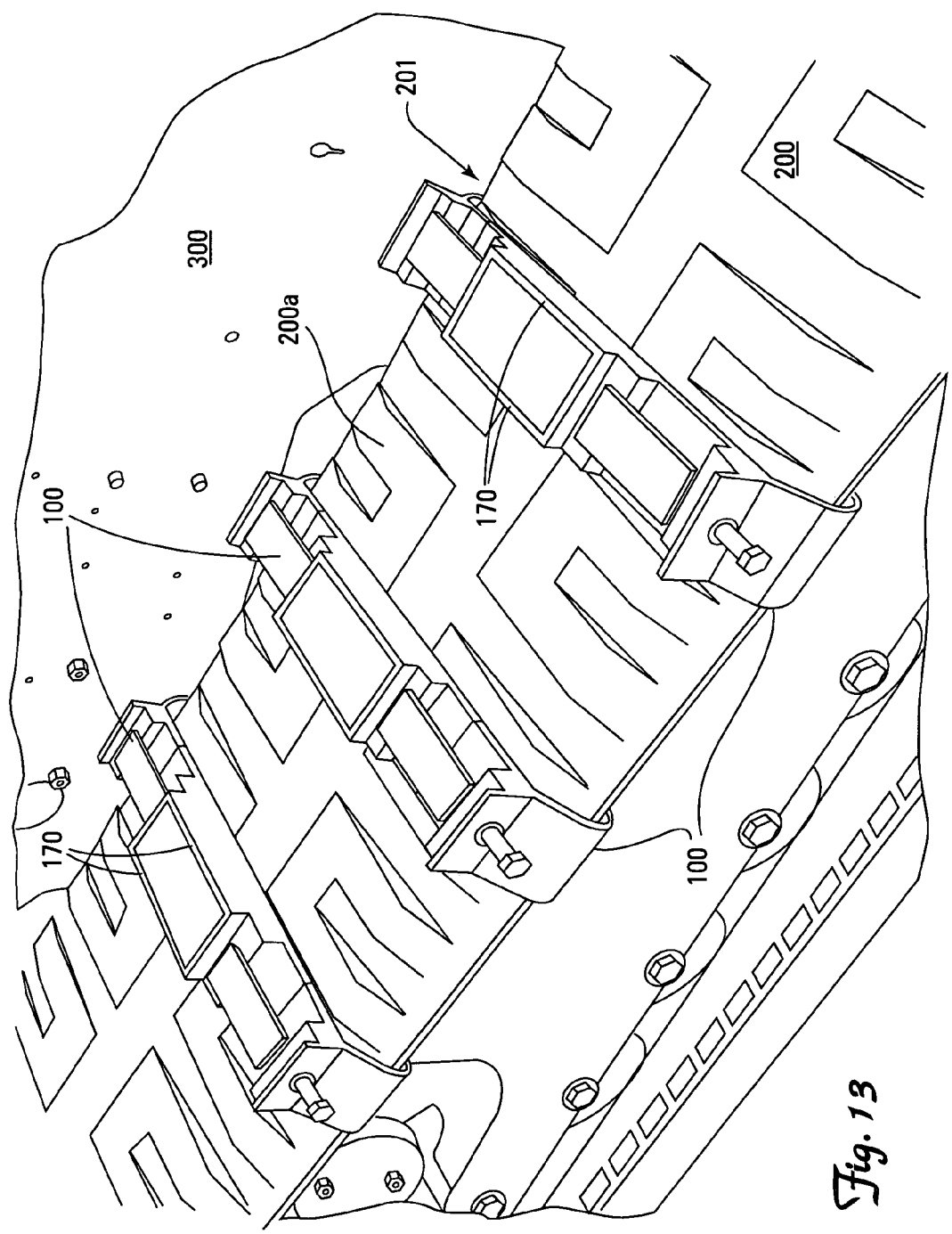
Figure 14:
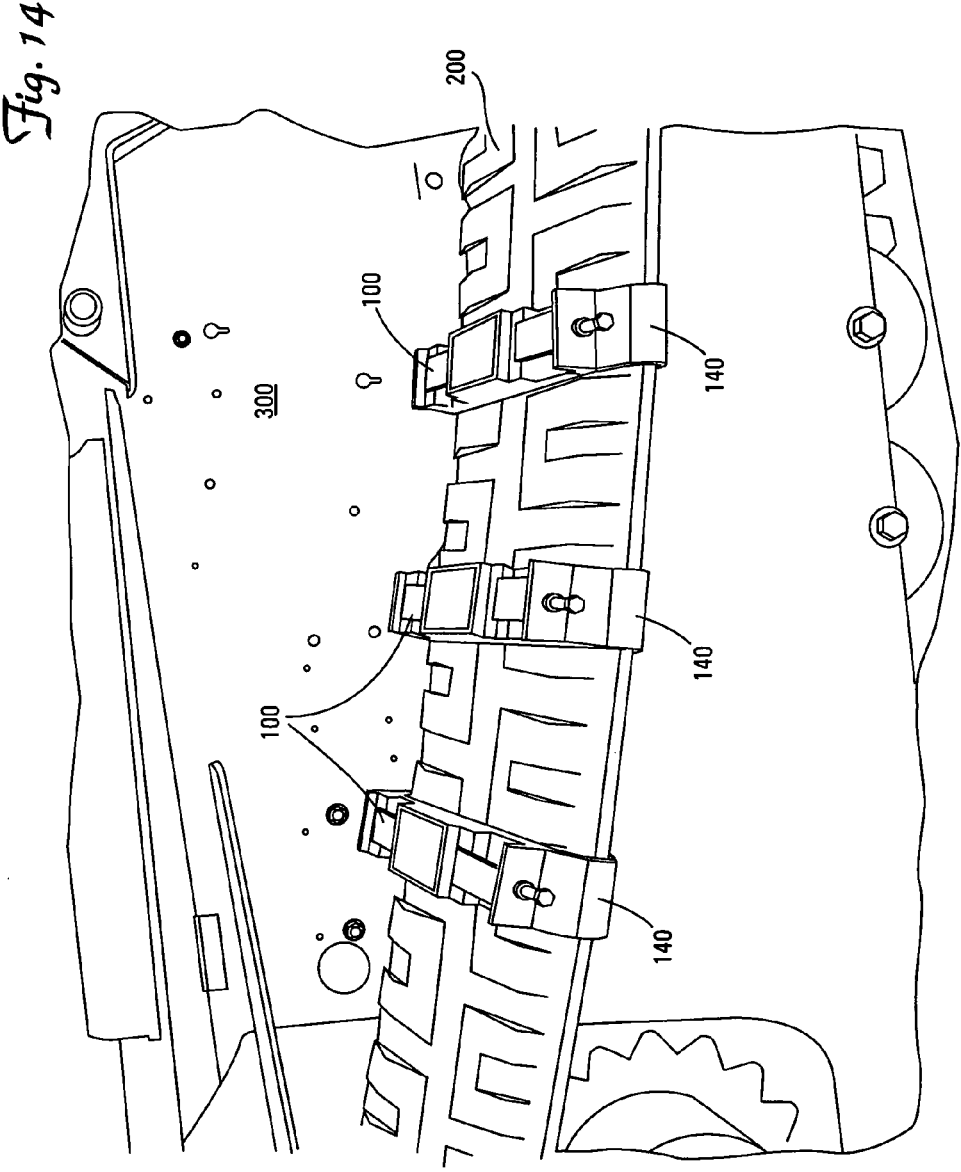
Figure 15:
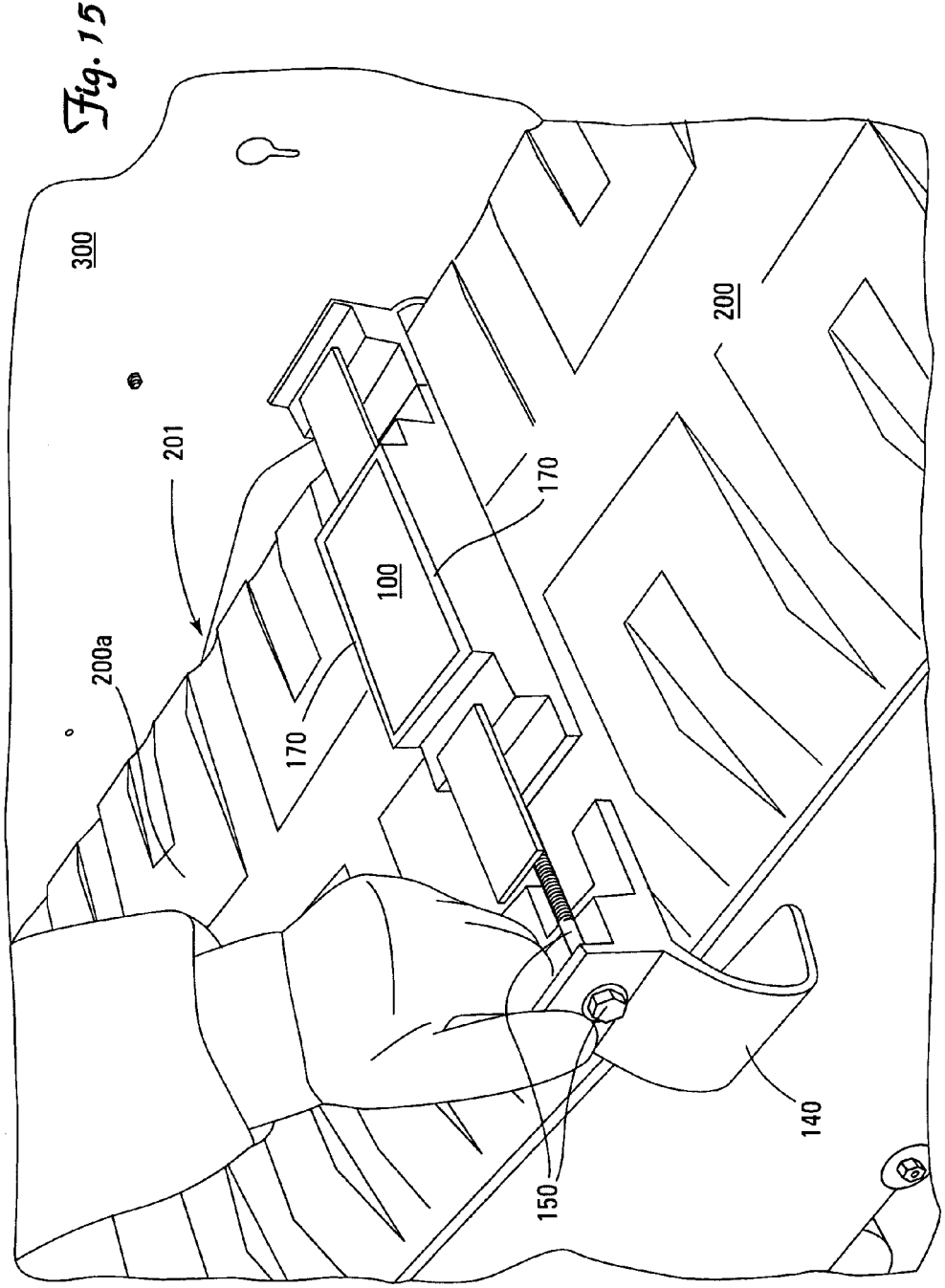
Figure 16:
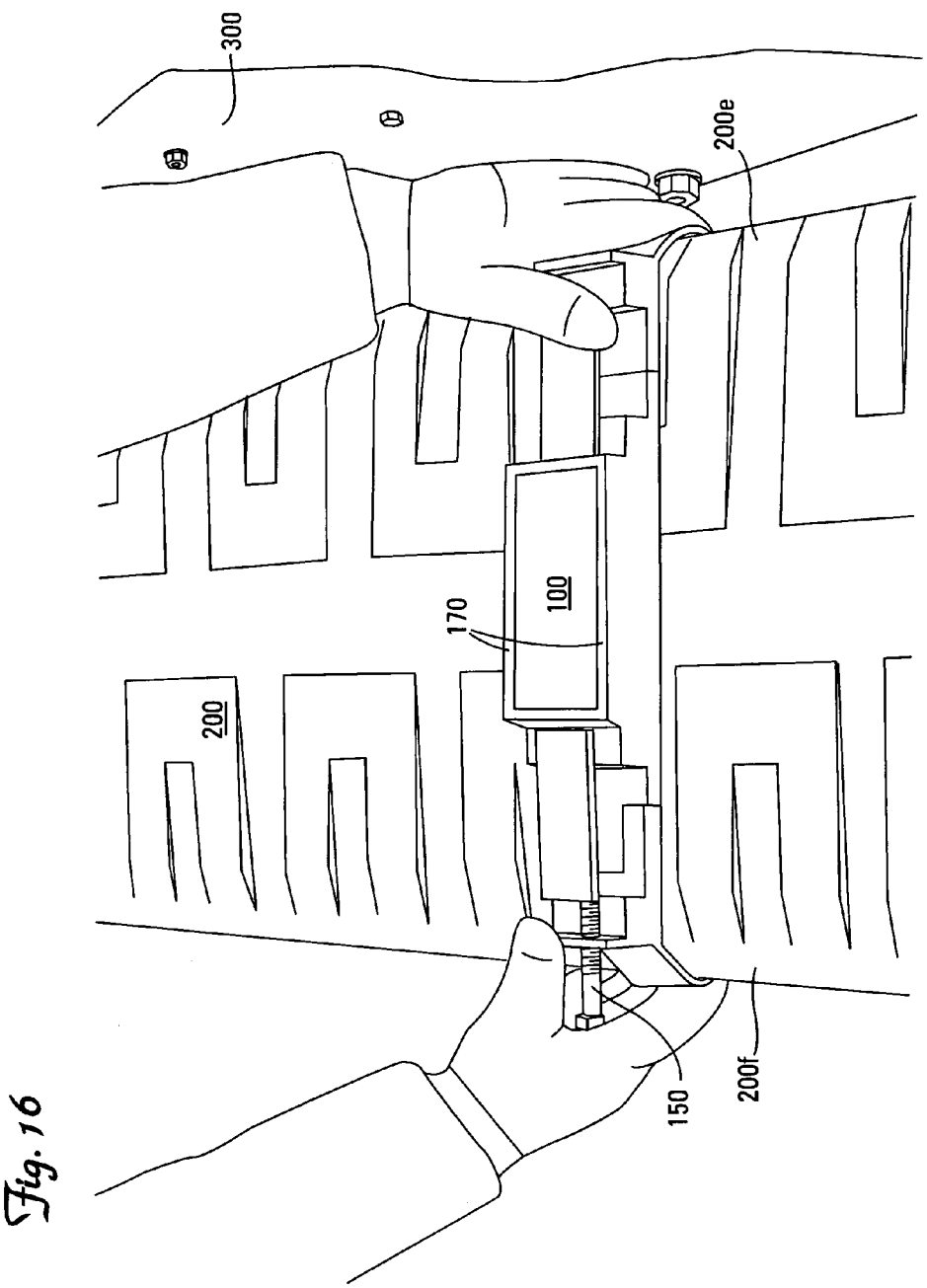
Figure 17:
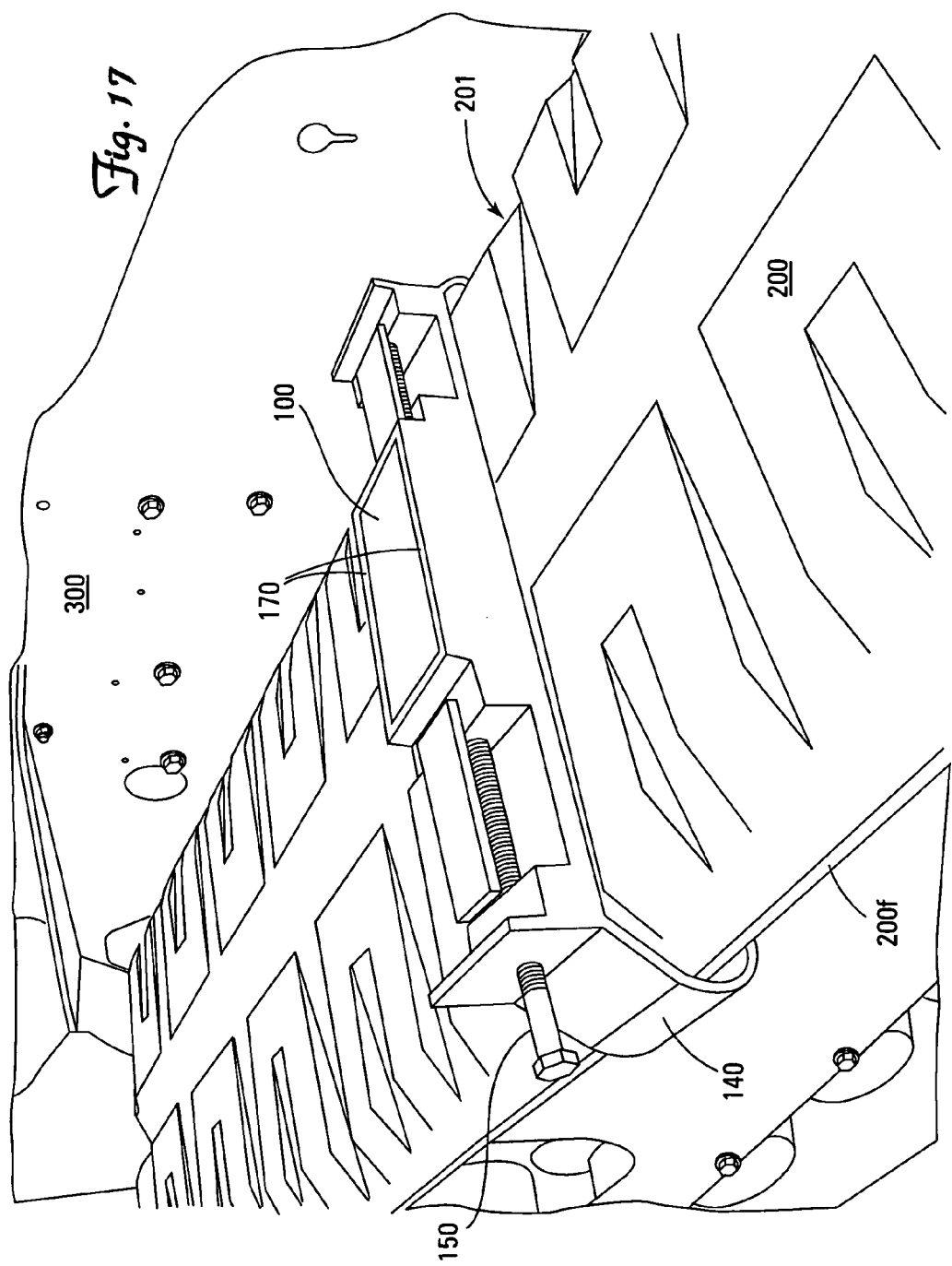

Referring to FIG. 10, a lateral bore 149 is provided through each end hook 140. The bore 149 is sized to accommodating passage of the shaft (not numbered) of a shoulder bolt 150 (depicted in FIGS. 1-6 and 11-18) while preventing passage of the head (not numbered). An axially aligned threaded bore (not shown) is provided in the ends 120e and 120f of the main base 120 for threadably engaging the shaft (not numbered) of the shoulder bolt 150. Hence, clockwise rotation of a shoulder bolt 150 within a threaded bore (not shown) in the main base 120 is effective for driving the associated end hook 140 inward towards the other end hook 140 towards a closed position, while counter clockwise rotation of the shoulder bolt 150 "releases" the associated end hook 140 and permits the end hook 140 to be slid along the shaft (not numbered) of the shoulder bolt 150 towards an open position.

Other repositioning mechanisms are known to those of routine skill in the art and may be usefully employed in the present invention, including a pawl and ratchet system, a worm screw and traveler pin system, etc. However, due to the high shear forces and muddy conditions to which the cleat 100 will be exposed, the system employing a shoulder bolt 150 threadably engaged to the main base 120 is the preferred option.

Projections extend transversely upward $z_1$ from the top 120a of the main body 120 and/or the top 140a of the end hooks 140 for biting engagement with a supporting surface (not shown) (e.g., dirt, mud, snow, ice, etc.). Any number of traction enhancing projections are known to those of ordinary skill in the art and may be usefully employed on the present invention. One suitable traction enhancing projection is a replaceable metal stud 160 as shown in FIGS. 1-6. Another suitable traction enhancing projection is a laterally x extending blade 170 as shown in FIGS. 11-19.

Use

Figure 18:
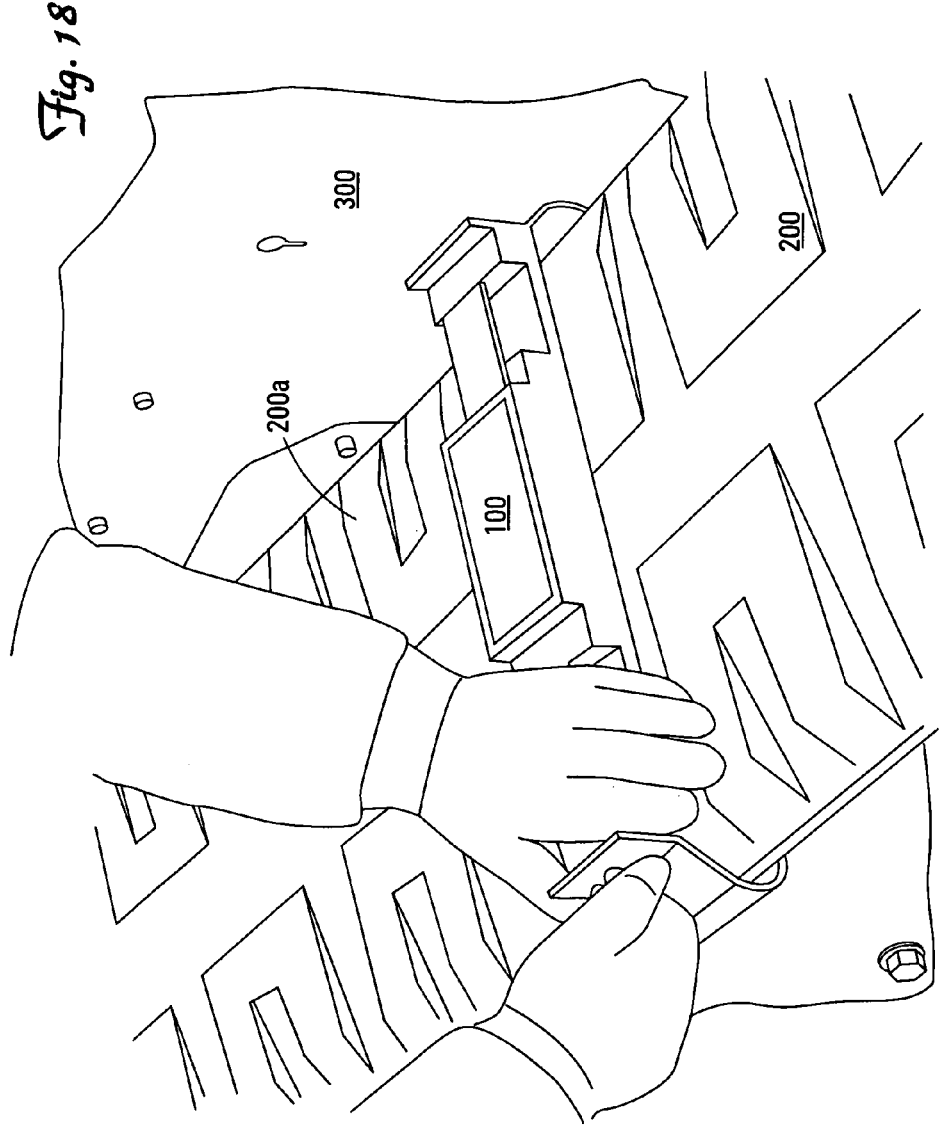
Figure 19:
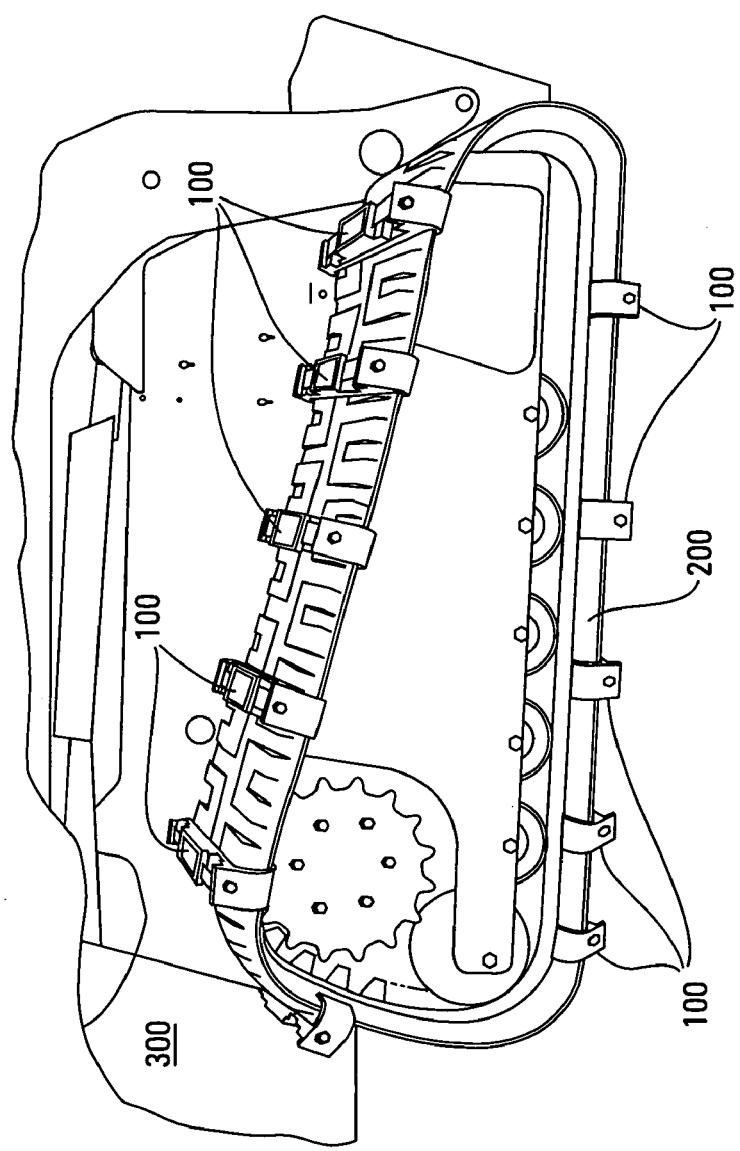
FIG. 19 is a perspective side view of the track loader depicted in FIGS. 11-18 after the set of cleats has been attached to the track.

The traction provided by the tracks 200 on a mobile construction unit 300 can be enhanced by attaching a set of cleats 100 in spaced relationship along the length of the tracks 200 as shown in FIG. 18. Each cleat 100 can be attached by (i) positioning the laterally x repositionable end hook(s) 140 into the open position, (ii) laying the body 120 onto the outward facing major surface 200a of the track 200 with the end hooks 140 extending over the sides 200e and 200f of the track 200 and projection(s) 160 and/or 170 extending away from the outward facing major surface 200a of the track 200, and (ii) actuating the repositioning assembly to move the repositionable end hook 140 towards the closed position (i.e., sliding the repositionable end hook 140 along the length of the shoulder bolt 150 until the end hook 140 engages the side 200e or 200f of the track 200 and then rotating the shoulder bolt 150 clockwise to forcibly drive the end hook 140 into the side 200e or 200f of the track 200). The cleat 100 needs to be positioned on the track 200 so that the stabilizing fins 146 on the cleat 100 can extend into a groove 201 in the outward facing major surface 200a of the track 200.

I claim:

1. A cleat for releasable clamped engagement to a continuous rubber track on a mobile construction unit for improving traction, comprising:
    (a) a body with downwardly extending, inwardly facing and laterally spaced end hooks, wherein at least one of the end hooks is laterally repositionable relative to the other end hook between an open position and a closed position,
    (b) at least one projection extending upward from the body effective for biting engagement with a supporting surface, and
    (c) a manually operable repositioning assembly for reversibly driving the at least one laterally repositionable end hook towards the other end hook, whereby the body may be clamped onto a rubber track on a mobile construction unit wherein the rubber tracks have grooves on the outward facing major surface creating tread on the rubber track, the cleat further comprises a stabilizing fin extending downward from the body proximate each lateral end of the body, and the body is adapted to be laid onto the track with each stabilizing fin positioned within a groove in the outward facing major surface of the track.

2. The cleat of claim 1 wherein the at least one projection is a plurality of individually replaceable studs.

3. The cleat of claim 1 wherein the repositioning assembly is a bolt with a shaft slidably extending through a laterally extending orifice in the repositionable end hook and threadably engaging the body.

4. A method for enhancing the traction of a tracked mobile construction unit, comprising the steps of:
    (a) obtaining a mobile construction unit equipped with a pair of tracks, wherein each track has an outward facing major surface and lateral sides,
    (b) obtaining a plurality of cleats, each comprising at least:
        (i) a body with downwardly extending, inwardly facing and laterally spaced end hooks, wherein at least one of the end hooks is laterally repositionable relative to the other end hook between an open position and a closed position, (ii) at least one projection extending upward from the body effective for biting engagement with a supporting surface, and
(iii) a manually operable repositioning assembly for reversibly driving the at least one laterally repositionable end hook towards the other end hook,
(c) clamping a cleat onto the track by:
(i) positioning the laterally repositionable end hook into the open position,
(ii) laying the body onto the outward facing major surface of the track with the end hooks extending over the sides of the track and the at least one projection extending away from the outward facing major surface of the track, and
(iii) actuating the repositioning assembly to move the repositionable end hook towards the closed position, thereby clamping the cleat to the track by catching the sides of the track within the end hooks and squeezing the track between the end hooks,
(d) repeating step (c) to attach a plurality of longitudinally spaced cleats around the track, and
(e) repeating steps (c) and (d) for the other track; wherein (i) the tracks have grooves on the outward facing major surface creating tread on the track, (ii) the cleat further comprises a stabilizing fin extending downward from the body proximate each lateral end of the body, and (iii) the body is laid onto the track with each stabilizing fin positioned within a groove in the outward facing major surface of the track.

5. The method of claim 4 wherein the at least one projection is a plurality of individually replaceable studs.

6. The method of claim 4 wherein (i) the repositioning assembly is a bolt with a shaft slidably extending through a laterally extending orifice in the repositionable end hook and threadably engaging the body, and (ii) actuation of the repositioning assembly to move the repositionable end hook towards the closed position comprises rotation of the bolt so as to draw the bolt into the body.

\* \* \* \* \*